(12) United States Patent
Graboski

(10) Patent No.: US 8,844,517 B2
(45) Date of Patent: Sep. 30, 2014

(54) SOLAR HOT WATER AND RECOVERY SYSTEM

(76) Inventor: Timothy Michael Graboski, Pompano Beach, FL (US)

( * ) Notice: Subject to any disclaimer, the term of this patent is extended or adjusted under 35 U.S.C. 154(b) by 362 days.

(21) Appl. No.: 13/311,054

(22) Filed: Dec. 5, 2011

(65) Prior Publication Data

US 2012/0125321 A1 May 24, 2012

(51) Int. Cl.
| | | |
|---|---|---|
| *F24J 2/30* | (2006.01) | |
| *F24J 2/00* | (2014.01) | |
| *F25B 27/00* | (2006.01) | |
| *F24D 11/00* | (2006.01) | |
| *F24D 11/02* | (2006.01) | |
| *F28D 7/02* | (2006.01) | |

(52) U.S. Cl.
CPC .................. *F28D 7/022* (2013.01); *Y02B 30/52* (2013.01); *F24D 11/003* (2013.01); *F24D 11/0235* (2013.01); *Y02B 10/70* (2013.01); *Y02B 10/20* (2013.01)
USPC ........... 126/645; 126/643; 126/714; 62/235.1

(58) Field of Classification Search
USPC ........................ 126/643, 645, 714; 62/235.1
See application file for complete search history.

(56) References Cited

U.S. PATENT DOCUMENTS

| | | |
|---|---|---|
| 4,011,731 A | 3/1977 | Meckler |
| 4,111,259 A | 9/1978 | Lebduska |
| 4,123,003 A | 10/1978 | Winston |
| 4,165,036 A | 8/1979 | Meckler |
| 4,242,873 A | 1/1981 | Hino |
| 4,302,942 A | 12/1981 | Charters et al. |
| 4,339,930 A | 7/1982 | Kirts |
| 5,054,542 A | 10/1991 | Young et al. |
| 2007/0028634 A1 | 2/2007 | Twaddle |
| 2010/0114384 A1 | 5/2010 | Maxwell |
| 2011/0041536 A1 | 2/2011 | O'Brien et al. |

FOREIGN PATENT DOCUMENTS

CN 101178230 A * 5/2008 ................ F24F 5/00

* cited by examiner

*Primary Examiner* — Kenneth Rinehart
*Assistant Examiner* — William Corboy
(74) *Attorney, Agent, or Firm* — GableGotwals

(57) ABSTRACT

A solar hot water and recovery system includes a water loop, a refrigerant loop and a solar loop. Cross-heat exchange occurs in a first heat exchanger between the heat transfer mediums of the refrigerant loop and the solar loop to produce a super-heated fluid stream which is returned to the air conditioning or heat pump unit. Cross-heat exchange also takes place in a second heat exchanger between the now-lower temperature heat transfer medium of the solar loop and the water loop to produce a heated water stream. The main objective of the system is to superheat refrigerant and use all excess heat for heating the water. The heat exchangers are preferably housed in the same heat recovery unit and arranged so that the refrigerant heat exchange area is before the water heat exchange area, thereby maximizing solar potential.

10 Claims, 2 Drawing Sheets

SOLAR HOT WATER AND RECOVERY SYSTEM

FIELD OF INVENTION

This invention relates generally to systems, apparatuses, and methods for heating water. More particularly, this invention relates to systems, apparatuses, and methods for using solar energy to heat, or provide complementary heating means for, a contained water source.

BACKGROUND OF THE INVENTION

A heat recovery unit ("HRU") is a device well known in the art for capturing waste heat discharged from the refrigerant cycle in an air conditioning or heat pump system. The HRU, which is installed in the refrigerant hot gas line between the compressor and the condenser (on an air conditioner) or between the condenser and reversing valve (on a heat pump system), transfers the captured heat into a hot water tank. To accomplish this transfer, the water side of the HRU is connected in a circulation loop with the hot water tank, with the cold water supply line inlet water stream. By heating a portion of the cold water supply prior to it entering the tank, the HRU reduces the amount of energy consumed by the tank itself in heating the water. Because cold air or vapor exits the refrigerant side of the HRU, the unit also improves the cooling efficiency of the air conditioning or heat pump system. However, as the energy efficiency of air conditioning and heat pump systems have improved over time with better and newer designs, the amount of waste heat available as an input to the HRU has decreased accordingly. Therefore, the performance and cost effectiveness of a HRU for its intended purpose have declined.

An alternate method of reducing the amount of conventional energy to heat a water source is the use of a solar energy system. Rather than capturing waste heat generated by an air conditioning or heat pump system, these solar energy systems attempt to directly heat the water by passing the water through heat exchangers in communication with the solar collectors or panels. However, this direct heating method requires the water to be pumped relatively long distances. The solar panels are typically roof-mounted whereas the water source, in the case of a hot water tank, is located within the building structure or, in the case of a swimming pool, is at ground level. Additionally, the method is costly because of the need for pumps and multiple collectors or panels to accomplish the heat transfer.

Various inventors have attempted to design more energy-efficient systems to heat water. For example, U.S. Pat. No. 4,242,873 to Hino discloses a system of using radiant energy to heat gas from a heat pump refrigerant circuit and then send the heated gas to a liquid reservoir. However, Hino must pump the liquid to be heated through a heat exchanger. U.S. Pat. Appl. Pub. No. 2010/0114384 to Maxwell discloses a heat pump controller in which heat pump HVAC fluid enters a main loop and passes through a solar thermal panel to provide energy transfer to swimming pools or domestic hot water. Similar to Hino, Maxwell circulates the fluid through the single heat exchanger. Last, U.S. Pat. No. 5,054,542 to Young et al. discloses a complex heat transfer system that combines heat obtained from a building during the air conditioning cycle (or from environmental panels) to heat a hot water tank, swimming pool or space heater. A compressor superheats the heating medium and the superheated heating medium is directed to a helix coil through which water is passing. Young does not make use of a solar panel and does not route the heated waste gas stream to a heat recovery unit ("HRU") plumbed in a conventional manner to a hot water tank or in communication with a circulation loop of a swimming pool.

SUMMARY OF THE INVENTION

A solar hot water recovery system made according to this invention uses a solar energy loop in combination with a refrigerant loop to heat a water source. The solar loop, which includes a heat transfer medium such as distilled water or propylene glycol, is in communication with a first heat exchanger of a heat recovery unit ("HRU"). The refrigerant loop, which captures waste heat generated by an air conditioning or heat pump system, is also in communication with the first heat exchanger. Cross-heat exchange takes place within the first heat exchanger between the heat transfer medium of the solar loop and the refrigerant medium of the refrigerant loop in order to produce a superheated refrigerant stream which is then returned to the air conditioning or heat pump system. The cooled but still hot heat transfer medium of the solar loop is then routed to a second heat exchanger of the HRU. Cross-heat exchange takes place within the second heat exchanger between this still hot heat transfer medium and to-be-heated water stream (domestic or potable and circulating as part of a water loop) in order to produce a heated hot water stream. This heated hot water stream is then returned to the hot water source or routed to a plumbing fixture for use. De-superheating characteristics are taken advantage of during non-sunlight hours of operation, with the refrigerant medium of the refrigerant loop being cooled by, and therefore heating, the heat transfer medium of the solar loop (that is to say, the refrigerant medium is cooled, at most, to its saturation point but no lower)

When the air conditioning or heat pump system is not running an independent pump system located within the HRU allows for continued solar water heating. The to-be-heated water stream circulates through the second heat exchanger of the heat recovery unit where cross-heat exchange occurs between it and the heat transfer medium of the solar loop, reducing consumption and providing essentially free water heating. When the air conditioning or heat pump system returns to normal operation, extra heat is available from the cross-heat exchange taking place within the first heat exchanger of the HRU and between the solar loop and the refrigerant loop. This also has the benefit of improving the performance of the air conditioning or heat pump system.

The solar technology reduces the electricity consumption of the standard system. Because an extra heat exchanger is involved as a second heating mechanism, the entire system can achieve a higher desired water temperature in a shorter period of time when compared to other systems, including conventional solar heating and HRU installations. This feature further reduces the amount of electricity consumed.

Compared to conventional HRU installations, a solar heat recovery system made according to this invention is at least double the efficiency with respect to the amount of heat transferred to the water source. Objects of this invention include but are not limited to the following: (1) enhance the efficiency and effectiveness of a conventional HRU by using solar energy to superheat a refrigerant and use all excess heat for heating the water; (2) heat a contained water source without having to pump portions of that water source to and from a solar panel; (3). continue to solar heat the water source without the assistance of the mechanical equipment (heating or cooling); and (4) enhance the efficiency and effectiveness of heating/cooling units, including those with high seasonal energy efficiency ratings (SEER) (e.g., above about 13 SEER, including those above 20 SEER).

Figure 1:
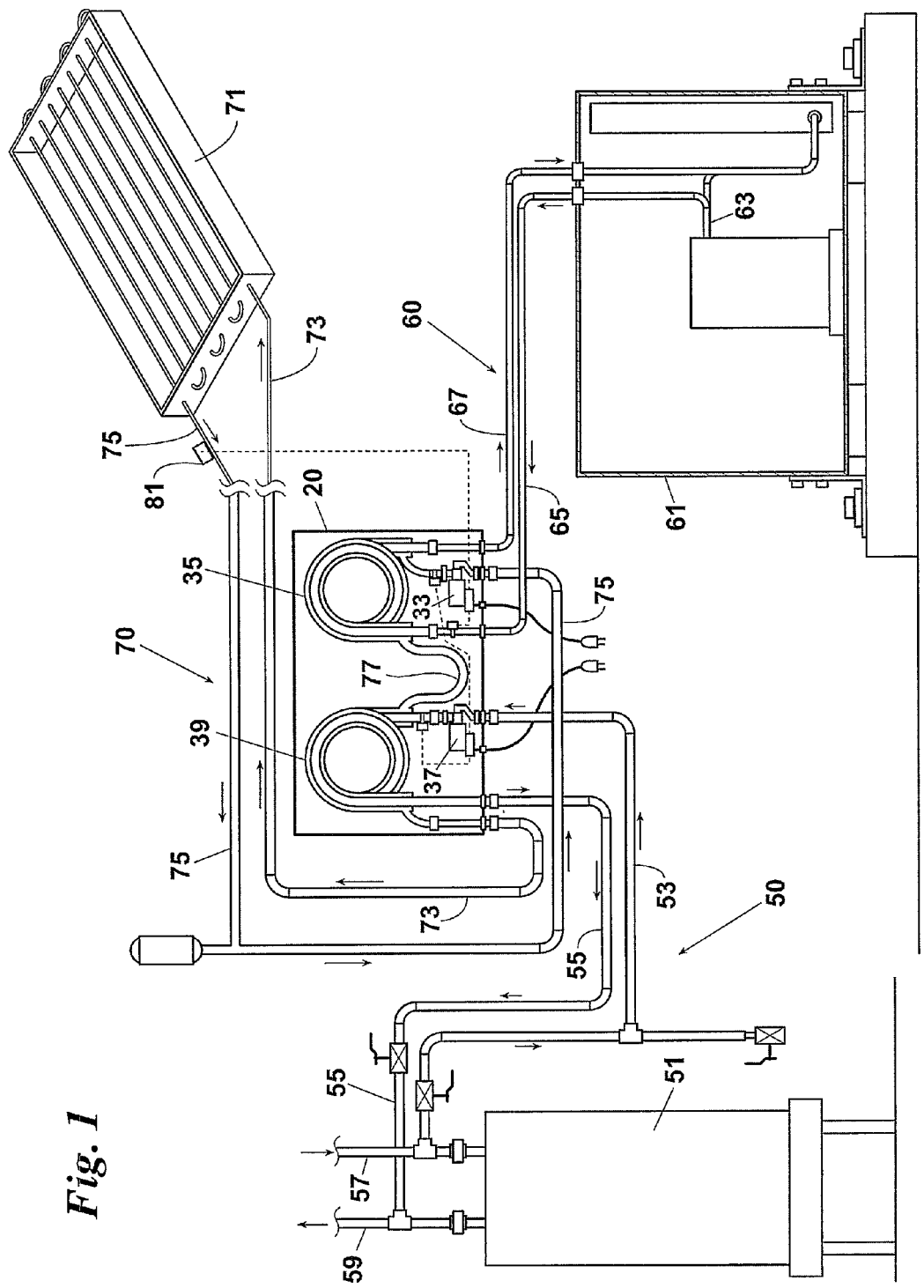
FIG. 1 is a schematic which illustrates a preferred embodiment of a solar hot water and recovery system made according to this invention and used to heat a domestic potable water source. A solar loop, refrigerant loop and water loop pass through a heat recovery unit having a first and second heat exchanger.
Figure 2:
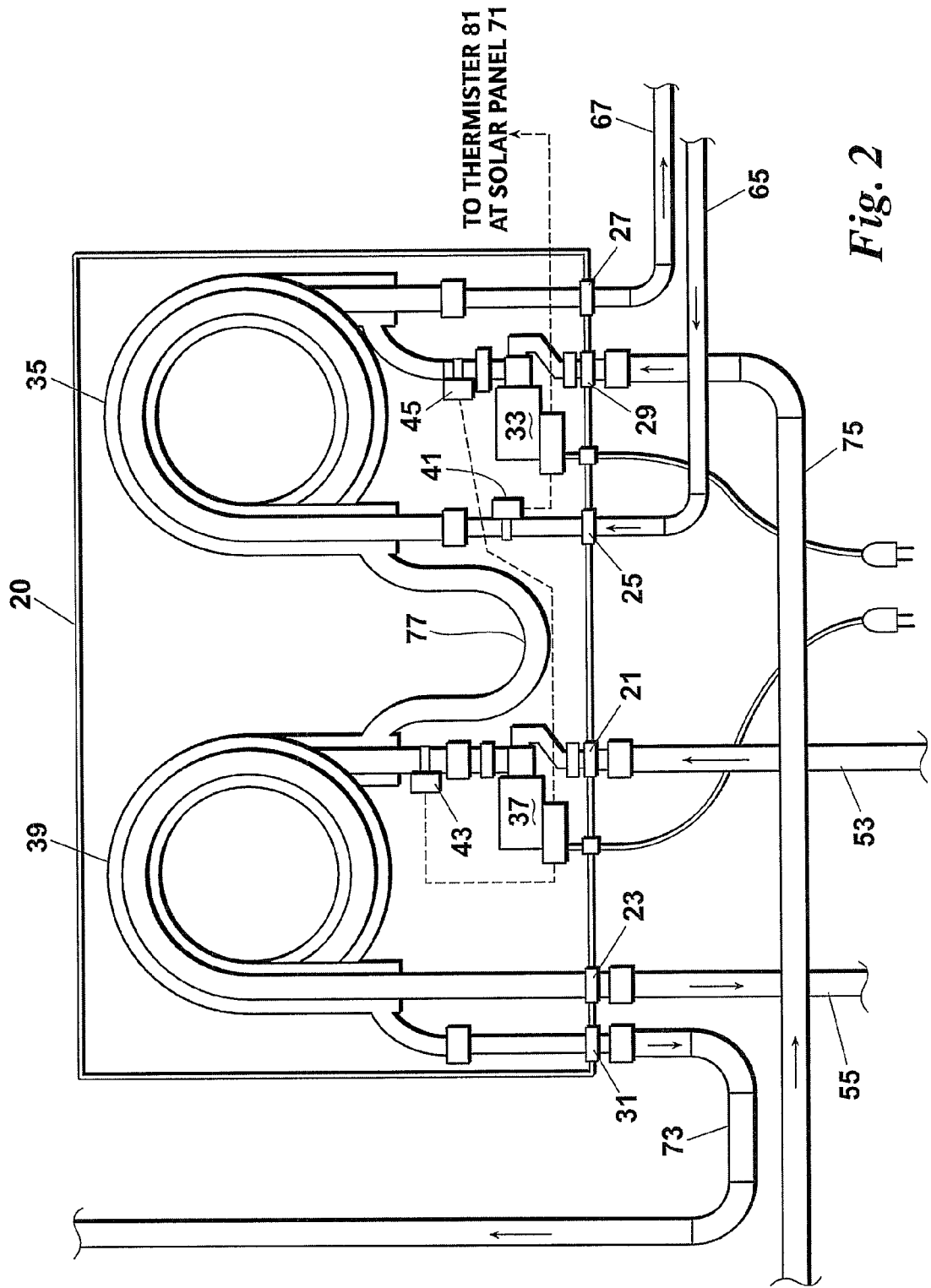
FIG. 2 is a schematic which illustrates a preferred embodiment of the heat recovery unit ("HRU"). The HRU includes a first heat exchanger and a second heat exchanger. Cross-heat exchange takes place within the first heat exchanger and between the heat transfer medium of the solar loop and the refrigerant medium of the refrigerant loop. Cross-heat exchange takes place within the second heat exchanger and between this still hot heat transfer medium and a hot water source (domestic or potable and circulating as part of a water loop) in order to produce a further heated hot water stream. When the heating/air conditioning unit is not running, cross-heat exchange continues to take place between the solar loop and the water loop. During non-sunlight hours, cross-heat exchange continues to take place between the solar loop and the refrigerant loop, with the refrigerant loop being cooled by the solar loop.

Elements and Numbering Used in the Drawings and Detailed Description

| | |
|---|---|
| 10 | Solar hot water recovery system |
| 20 | Heat recovery unit |
| 21 | Water loop inlet |
| 23 | Water loop outlet |
| 25 | Refrigerant loop fluid inlet |
| 27 | Refrigerant loop fluid outlet |
| 29 | Solar loop fluid inlet |
| 31 | Solar loop fluid outlet |
| 33 | First pump (solar pump) |
| 35 | First heat exchanger |
| 37 | Second pump (water pump) |
| 39 | Second heat exchanger |
| 41 | First thermistor (measuring 65) |
| 43 | Second thermistor (measuring 53) |
| 45 | Third thermistor (measuring 75) |
| 50 | Water loop |
| 51 | Water reservoir (tank or pool) |
| 53 | Water stream |
| 55 | Heated water stream |
| 57 | Cold water supply |
| 59 | Hot water supply |
| 60 | Refrigerant loop |
| 61 | Heating/cooling unit (a/c or heat pump) |
| 63 | Hot gas side of 61 |
| 65 | First heated fluid stream |
| 67 | Super-heated fluid stream |
| 70 | Solar loop |
| 71 | Solar panel/solar heat exchanger |
| 73 | Second cooled fluid stream |
| 75 | Second heated fluid stream |
| 77 | First cooled fluid stream |
| 79 | Hot side of 71 |
| 81 | Fourth thermistor (measuring 75 at 71) |

DETAILED DESCRIPTION OF THE PREFERRED EMBODIMENTS

Referring first to FIG. 1, a solar hot water and recovery system 10 includes a water loop 50, a refrigerant loop 60 and a solar loop 70. Cross-heat exchange occurs in a first heat exchanger 35 between the heat transfer mediums 65, 75 of the refrigerant loop 60 and the solar loop 70 to produce a super-heated fluid stream 67. Cross-heat exchange also takes place in a second heat exchanger 39 between the now-lower temperature heat transfer medium 77 of the solar loop 70 and the water loop 50 to produce a heated water stream 55. More specifically, the system 10 includes the steps of:

routing to a first heat exchanger 35 a first heated fluid stream 65 exiting the hot gas side 63 of a cooling unit 61 and a second heated fluid stream 75 exiting a solar panel 71;

transferring heat between the first heated fluid stream 65 and the second heated fluid stream 75 so as to further heat the first heated fluid stream 75 and produce a first cooled fluid stream 77 and a super-heated fluid stream 67 exiting the first heat exchanger 35;

routing to a second heat exchanger 39 the first cooled fluid stream 77 exiting the first heat exchanger 35 and a water stream 53;

transferring heat between the first cooled fluid stream 77 and the water stream 53 so as to heat the water stream 53 and produce a heated water stream 55 and a second cooled fluid stream 73 exiting the second heat exchanger 39;

routing the super-heated fluid stream 67 to the condensing unit 61; and routing the second cooled fluid stream 73 to the solar panel 71.

The heated fluid streams 65, 75, cooled fluid streams 73, 77, and super-heated fluid stream 67 may be a gas stream, liquid stream, or a combination gas/liquid stream which are routed within the system 10 using conventional plumbing means. Typically, streams 73, 75 and 77 are a heat transfer medium such as distilled water or propylene glycol. Streams 65 and 67 are a refrigerant and may cycle between a liquid, gas, or vapor state depending on the temperature of the refrigerant. Water streams 53, 55 may be a domestic or potable water source.

Each heat exchanger 35, 39 is sized to accomplish the appropriate heat transfer task. In a preferred embodiment, the heat exchangers 35, 39 are housed within the same heat recovery unit ("HRU") 20 and are spiraled- or coil-shaped heat exchangers. Alternatively, but not preferably, heat exchangers 35, 39 could be housed in separate HRUs 20. Heat recovery unit 20 includes appropriate inlets 21, 25, 29 and outlets 23, 27, 31 for the water, refrigerant, and solar loops 50, 60 and 70, respectively. Water inlet 21 and outlet 23 are plumbed to the water reservoir 51 by way of conventional plumbing means. In this embodiment, water reservoir 51 is a hot water tank of a kind well known in the art for storing and heating potable water, having a cold water supply 57 in and a hot water supply 59 out. Water reservoir 51 could also be a swimming pool.

A first thermistor 41 is located upstream of the first heat exchanger 35 and measures the temperature of the first heated fluid stream 65 exiting the hot gas side 63 of the condensing unit 61 and entering the HRU 20. First thermistor 41 is preferably set at 125° F. A second thermistor 43 is located upstream of the second heat exchanger 39 and measures the temperature of the water stream 53 as it enters the HRU 20. Second thermistor 43 is preferably set at 140° F. A third thermistor 45 is located measures the temperature of second heated fluid stream 75. Third thermistor is preferably set at 125° F. A fourth thermistor 81 is located on the hot side of the solar panel 71 and measures the temperature of the second heated fluid stream 75. Fourth thermistor 81 is preferably set at 125° F.

The HRU 20 includes two pumps 33, 37. The first pump 33, which is on refrigerant loop 60, turns on when the temperature of the second heated fluid stream 75 (that is, the stream exiting the hot side 79 of solar panel 71) is greater than 125° F. or the temperature of the first heated fluid stream 65 (that is, the stream exiting the hot gas side 63 of the cooling unit 61) is at least 125° F. There is no need to have a high temperature cut-off. The second pump 37, which is on water loop 50, turns on if the temperature of the second heated fluid stream 75 at pump 33 is greater than 125° F. and turns off if the temperature of the incoming water stream 53 is greater than 140° F.

Note that both pumps 33, 37 are in communication with solar loop 70 and that, depending on weather conditions or the condition of the cooling unit 61, cooling unit 61 may not be operating. The second pump 37 is preferably wired to initiate first pump 33 to circulate heat transfer fluid 75, 77 when there is a call for domestic hot water but the air conditioning or heat pump system (in cooling mode) is not running. For example, first pump 33, which is the solar loop 70 pump, communicates with two thermistors 41 (first heated fluid stream 65 in), 81 (second heated fluid stream 75 at solar panel 71) for turning the pump 33 on. Second pump 37, which is the water loop 50 pump, communicates with two thermistors, 43 (water stream 53 in), 45 (second heated fluid stream 75 in), with thermistor 45 for turning the pump 37 on and thermistor 43 for turning the pump 37 off. First pump 33 is preferably always running if the temperature of one of the streams 65, 75 is at least 125° F. in order to make hot water when the heating/cooling unit 61 is not running.

The main objective of system 10 is to superheat refrigerant and use all excess heat for heating the water. The HRU 20 should be designed so that the refrigerant heat exchange area (first heat exchanger 35) is before the water heat exchange area (second heat exchanger 39), thereby maximizing solar potential. In tests conducted by the inventor in mid-November 2011 on a 2-ton, 16 SEER air conditioning unit in communication with a solar hot water and recovery system made according to this invention, the SEER performance of the unit more than doubled to about 36 SEER (with an EER of about 29). This is well beyond the SEER performance of what original equipment manufacturers can deliver. Conditions for this test were as follows: outdoor temperature of about 80° F. with 60% relative humidity, indoor temperature of about 68° with 61% relative humidity.

A solar hot water and recovery system made and practiced according to this invention, and a method for its use, is defined by the following claims and equivalent elements thereof.

What is claimed is:

1. A solar hot water and recovery system comprising:
a solar loop in communication with a solar panel and a first and a second heat exchanger;
a refrigerant loop in communication with a refrigerant cycle of a cooling unit and the first heat exchanger; and
a water loop in communication with a water reservoir and the second heat exchanger;
the first heat exchanger arranged to cross-heat exchange a first heated fluid stream exiting a hot gas side of the cooling unit and a second heated fluid stream exiting a hot side of the solar panel in order to produce a super-heated fluid stream and a first cooled fluid stream;
the second heat exchanger arranged to cross-heat exchange an incoming water stream and the super-heated fluid stream exiting the first heat exchanger in order to produce a heated water stream and a second cooled fluid stream;
the second cooled fluid stream being returned to the solar panel, the first cooled fluid stream being returned directly to the cooling unit, the heated water stream being returned to at least one of the water reservoir and a fixture in communication with the water reservoir;
wherein the above-mentioned cross-heat exchanges occur external to the cooling unit and the water reservoir.

2. A system according to claim 1 further comprising the first heat exchanger being arranged upstream of the second heat exchanger.

3. A system according to claim 2 further comprising the first and second heat exchangers being housed in a same heat recovery unit.

4. A system according to claim 1 further comprising a first and a second pump, the first pump in communication with the first heat exchanger, the second pump in communication with the second heat exchanger, the first pump being arranged to operate when the cooling unit is not operating.

5. A method for capturing waste heat generated by an air conditioning unit or heat pump unit ("a cooling unit"), the method comprising the steps of:
routing to a first heat exchanger a first heated fluid stream exiting a hot gas side of a compressor of the cooling unit and a second heated fluid stream exiting a solar panel;
transferring heat between the first heated fluid stream and the second heated fluid stream so as to further heat the second heated fluid stream and produce a first cooled fluid stream and a super-heated fluid stream exiting the first heat exchanger;
routing to a second heat exchanger the super heated fluid stream exiting the first heat exchanger and a water stream;
transferring heat between the super heated fluid stream and the water stream so as to heat the water stream and produce a heated water stream and a second cooled fluid stream exiting the second heat exchanger;
directly routing the first cooled fluid stream to the cooling unit; and
routing the second cooled fluid stream to the solar panel;
wherein the transferring heat steps occur external to a water reservoir, the heated water stream being routed to the water reservoir.

6. A method according to claim 5 wherein the transferring heat steps occur within a single unit.

7. A method according to claim 6 wherein the single unit is a heat recovery unit.

8. A method according to claim 5 wherein the water reservoir is a domestic water tank.

9. A solar hot water and recovery system according to claim 1 wherein the water reservoir is a tank.

10. A solar hot water and recovery system according to claim 1 wherein the cooling unit is selected from the group consisting of an air conditioning unit and a heat pump unit.

* * * * *